United States Patent
Chen et al.

(10) Patent No.: US 12,235,162 B1
(45) Date of Patent: Feb. 25, 2025

(54) METHOD, USE, DEVICE, ELECTRONIC EQUIPMENT AND STORAGE MEDIUM FOR MEASURING POLARIZATION UNIFORMITY OF NON-UNIFORMLY TOTALLY POLARIZED BEAMS

(71) Applicant: ZHEJIANG UNIVERSITY, Zhejiang (CN)

(72) Inventors: Kan Chen, Hangzhou (CN); Kang Zou, Hangzhou (CN); Guofa Wang, Hangzhou (CN); Yijia Gong, Hangzhou (CN); Heliang Shen, Hangzhou (CN); Xiaowu Shu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 101 days.

(21) Appl. No.: 17/969,666

(22) Filed: Oct. 19, 2022

Related U.S. Application Data

(63) Continuation of application No. PCT/CN2021/096342, filed on May 27, 2021.

(51) Int. Cl.
*G01J 4/04* (2006.01)
(52) U.S. Cl.
CPC ........................................ *G01J 4/04* (2013.01)
(58) Field of Classification Search
CPC ................................................... G01J 4/04
See application file for complete search history.

(56) References Cited

FOREIGN PATENT DOCUMENTS

| CN | 103439001 A | 12/2013 |
|---|---|---|
| CN | 108398242 A | 8/2018 |

(Continued)

OTHER PUBLICATIONS

International Search Report (PCT/CN2021/096342); Date of Mailing: Aug. 12, 2021.

(Continued)

*Primary Examiner* — Uzma Alam
*Assistant Examiner* — Huy Phillip Pham
(74) *Attorney, Agent, or Firm* — W&G Law Group

(57) ABSTRACT

A method, a use, a device, an electronic equipment and a storage medium for measuring a polarization uniformity of non-uniformly totally polarized beams, which comprises the following steps: inputting a Stokes parameter distribution of a cross section of non-uniformly totally polarized beams; calculating the Stokes parameter distribution to correspond to a Poincare sphere; performing surface fitting on a polarization state distribution on the Poincare sphere through a spatial triangle surface fitting algorithm; calculating a sum $S_D$ of the areas of the fitted triangular surfaces; dividing $S_D$ by a total area $S_0$ of the unit Poincare sphere to obtain get the polarization uniformity $\overline{U}$ of the non-uniformly totally polarized beams. The method is used to solve the existing problem that the weighted polarization degree $\overline{P}$ and uniformity $\tilde{\delta}_P$ cannot quantitatively distinguish different types of non-uniformly totally polarized beams, and to obtain the types and contents of polarization states in the beam cross section.

7 Claims, 12 Drawing Sheets

(a) Uniformly polarized beams (b) Non-uniformly polarized beams

(56) References Cited

FOREIGN PATENT DOCUMENTS

| | | | |
|---|---|---|---|
| CN | 108956097 A | | 12/2018 |
| CN | 111811655 A | * | 10/2020 |
| CN | 112146760 A | | 12/2020 |
| JP | 2003021716 A | | 1/2003 |
| JP | 5991226 B2 | | 9/2016 |
| JP | 2017083294 A | | 5/2017 |
| KR | 20130038808 A | * | 4/2013 |
| WO | WO-2016133707 A1 | * | 8/2016 ............. G02B 6/272 |

OTHER PUBLICATIONS

CN First Office Action(202011042387.9); Date of Mailing: Apr. 16, 2021.
Measurement-Method-of-Müller-Matrix-Based-on-Trajectories-on-Poincare-Sphere.

* cited by examiner

METHOD, USE, DEVICE, ELECTRONIC EQUIPMENT AND STORAGE MEDIUM FOR MEASURING POLARIZATION UNIFORMITY OF NON-UNIFORMLY TOTALLY POLARIZED BEAMS

CROSS-REFERENCE TO RELATED APPLICATIONS

The present application is a continuation of International Application No. PCT/CN2021/096342, filed on May 27, 2021, which claims priority to Chinese Application No. 202011042387.9, filed on Sep. 28, 2020, the contents of both of which are incorporated herein by reference in their entireties.

TECHNICAL FIELD

The present disclosure relates to the fields of polarization state description and non-uniformly totally polarized beams, in particular to a method, a use, a device, an electronic equipment and a storage medium for measuring the polarization uniformity of non-uniformly totally polarized beams.

BACKGROUND

In the study on the polarization characteristics of light, light is usually regarded as uniformly polarized beams, that is, the polarization state is the same at different positions of the beam cross section. According to the degree of polarization P, uniformly polarized beams can be divided into totally polarized beams (P=1), partially polarized beams (0<P<1) and totally unpolarized beams (P=0). Totally polarized beams can be divided into linearly polarized beams, elliptically polarized beams and circularly polarized beams according to the trajectory of the end point of the electric field vector. However, in recent years, non-uniformly polarized beams, that is, polarization states are different at different positions of the beam cross section, has gradually become a research hotspot. Non-uniformlypolarized beams can be divided into non-uniformly partially polarized beams (NUPP beams) and non-uniformly totally polarized beams (NUTP Beams). The former indicates that there are some points in the cross-section of the beam whose polarization state is partially polarized, that is, the polarization degree P<1, while the latter indicates that all points in the cross-section of the beam are totally polarized, that is, the polarization degree P=1.

The early research work focused on the generation of non-uniformly totally polarized beams (NUTP Beams), including the use of interference, thermal stress and spatial light modulator. With the development of research, NUTP Beams has been widely used in many fields, such as optical tweezers, particle manipulation, material processing, microscope, surface plasmon detection and polarization tester and the like because of its non-uniformity of the polarization state in the beam cross section. Therefore, in order to better compare the characteristics of different NUTP Beams, it is necessary to propose corresponding measurement methods, similar to the degree of polarization in uniform polarized beams.

Based on Stokes matrix and Mueller matrix, the concept of weighted degree of polarization ($\bar{P}$) has been put forward in some literatures, which is used to characterize the weighted average value of degrees of polarization at different positions of the cross section of non-uniformly polarized beams. The specific calculation formula is as follows:

$$P(x,y) = \sqrt{\frac{(s_1^2(x,y) + s_2^2(x,y) + s_3^2(x,y))}{s_0^2(x,y)}} \quad (1)$$

$$\bar{P} = \frac{\iint I(x,y)P(x,y)dxdy}{\iint I(x,y)dxdy} \quad (2)$$

where $s_i$ (x,y), i=1,2,3 is Stokes parameter distribution, which can be measured by a CCD camera, and I(x,y) is light intensity distribution of the beam cross section.

When $0 < \bar{P} < 1$, it means that there is partially polarized beams in the polarization state of each point on the beam cross section, that is, non-uniformly partially polarized beams (NUPP beams); when $\bar{P} = 1$, it means that the polarization states of all points on the beam cross section are totally polarized beams, that is, non-uniformly totally polarized beams (NUTP Beams); when $\bar{P} = 0$, it means that the polarization states of all points on the beam cross section are totally unpolarized beams.

Another measurement method for non-uniformly polarized beams is uniformity $\tilde{\delta}_P$, which is defined as the dispersion degree of the polarization degree of each point on the beam cross section relative to the weighted polarization degree ($\bar{P}$), and is defined as follows:

$$\tilde{\delta}_P^2 = \frac{\iint I(x,y)[P(x,y) - \bar{P}]^2 dxdy}{\iint I(x,y)dxdy} \quad (3)$$

Formula (1) shows that $\tilde{\delta}_P$ reflects the uniformity of the polarization degree of each point on the beam cross section, and the range of $\tilde{\delta}_P^2$ is [0,½]. When $\tilde{\delta}_P=0$, it means that all points on the beam cross section are totally polarized beams.

The weighted polarization degree ($\bar{P}$) is used to measure the light intensity weighted average of the polarization degree of each point on the beam cross section, while the uniformity $\tilde{\delta}_P$ is used to measure the dispersion degree of the polarization degree of each point on the beam cross section. The above two indexes can only distinguish non-uniformly partially polarized beams from non-uniformly totally polarized beams, while non-uniformly totally polarized beams includes many kinds of polarized beams, such as spirally-polarized beams (SPBs), Laguerre-Gaussian polarized beams (LGBs), etc., but $\bar{P}$ and $\tilde{\delta}_P$ cannot distinguish different kinds of non-uniformly totally polarized beams. It is impossible to quantitatively analyze different kinds of non-uniformly totally polarized beams, let alone intuitively show the polarization state distribution (such as linearly polarized beams, circularly polarized beams, elliptically polarized beams) and content thereof in the beam cross section.

In order to overcome the above shortcomings, the present disclosure puts forward the concept of polarization uniformity to quantitatively analyze and evaluate the specific polarization state of non-uniformly polarized beams, especially non-uniformly totally polarized beams.

SUMMARY

The embodiments of the present disclosure aim to provide a method, a use, a device, an electronic equipment and a storage medium for measuring the polarization uniformity of non-uniformly totally polarized beams, so as to solve the existing problems that the weighted polarization degree $\bar{P}$ and uniformity $\tilde{\delta}_P$ cannot quantitatively obtain the types and contents of the polarization states on the beam cross section, and cannot provide effective guidance for the use of non-uniformly polarized beams.

In order to achieve the above purposes, the technical solutions adopted by the embodiments of the present disclosure are as follows:

In a first aspect, an embodiment of the present disclosure provides a method for measuring a polarization uniformity of non-uniformly totally polarized beams, including:

Inputting a Stokes parameter distribution of a cross section of non-uniformly totally polarized beams.

Calculating the Stokes parameter distribution to correspond to a Poincare sphere.

Performing surface fitting on a polarization state distribution on the Poincare sphere through a spatial triangle surface fitting algorithm.

Calculating a sum $S_D$ of the areas of the fitted triangular surfaces.

Dividing $S_D$ by a total area $S_0$ of the unit Poincare sphere to obtain the polarization uniformity U of the non-uniformly totally polarized beams.

Further, the step of performing surface fitting on the polarization state distribution on the Poincare sphere through the spatial triangle surface fitting algorithm specifically includes:

Inputting polarization state data points and setting a threshold value K.

Separating the polarization state data points according to the eight octants of a spatial rectangular coordinate system.

Performing Delaunay triangulation algorithm fitting on the polarization state data points in each octant.

Judging whether at least two sides of fitted Delaunay triangles are longer than the set threshold value K, if so, deleting the corresponding Delaunay triangle.

Describing the remaining Delaunay triangles after the above deletion on the Poincare sphere.

The data points on the Poincare sphere are divided into eight octants for Delaunay fitting respectively, which can reduce the computational cost of the algorithm, that is, the number of fitted Delaunay triangles; screening and eliminating Delaunay triangles whose side length is greater than the threshold value K can avoid the polarization state mutation data caused by errors in Stokes parameter distribution measurement, and reduce the fitting error.

Further, the sum $S_D$ of the areas of the fitted triangular surfaces is calculated by a Heron's formula, which specifically comprises:

Calculating an area $S_i$ of the corresponding Delaunay triangle according to the lengths of three sides of the fitted triangle:

$$S_i = \sqrt{p_i(p_i - a_i)(p_i - b_i)(p_i - c_i)} \quad (1)$$

where i is a serial number of the fitted Delaunay triangle, and $p_i$, $a_i$, $b_i$ and $c_i$ are respectively the half circumference and lengths of the three sides of the Delaunay triangle, so the total area of surface fitting is $$S_D = \sum_i S_i.$$

Further, the method also includes:

Performing mathematically statistics on the polarization state data points of non-uniformly totally polarized beams on the Poincare sphere to obtain the types and proportions of polarized beams existing on the beam cross section.

In a second aspect, an embodiment of the present disclosure provides a use of a method for measuring a polarization uniformity of non-uniformly totally polarized beams for measuring the characteristics of non-uniformly totally polarized beams, and the method for measuring a polarization uniformity of non-uniformly totally polarized beams is the method described in the first aspect.

In a third aspect, an embodiment of the present disclosure provides a device for measuring a polarization uniformity of non-uniformly totally polarized beams, including at least one processors and a memory configured to store programmable instructions executable by at least one processors, and the instructions are programmed as the following modules:

An input module configured for inputting a Stokes parameter distribution of a cross section of non-uniformly totally polarized beams.

A first calculation module configured for calculating the stoke parameter distribution to correspond to a Poincare sphere.

A fitting module configured for performing surface fitting on a polarization state distribution on the Poincare sphere through a spatial triangle surface fitting algorithm.

A second calculation module configured for calculating a sum $S_D$ of the areas of the fitted triangular surfaces.

A third calculation module configured for dividing $S_D$ by a total area $S_0$ of the unit Poincare sphere to obtain the polarization uniformity U of non-uniformly totally polarized beams.

Further, the device also includes:

A statistic module configured for performing mathematically statistics on the polarization state data points of non-uniformly totally polarized beams on the Poincare sphere to obtain the types and proportions of polarized beams existing on the beam cross section.

In a fourth aspect, an embodiment of the present disclosure provides an electronic equipment, including:

One or more processors.

A memory for storing one or more programs.

When the one or more programs are executed by the one or more processors, the one or more processors implement the method according to the first aspect.

In a fifth aspect, an embodiment of the present disclosure provides a computer readable storage medium on which a computer program is stored. When the program executed by a processor, implements the method according to the first aspect.

According to the above technical solutions, the embodiments of the present disclosure can intuitively obtain the polarization state distribution of each point on the cross section of non-uniformly totally polarized beams on the Poincare sphere by using the measurement method of polarization uniformity, and at the same time, the polarization state data points are fitted into a spatial curved surface, so that the spatial distribution uniformity of polarization states on the cross section of non-uniformly totally polarized beams on the Poincare sphere can be quantitatively analyzed. The method of the present disclosure can quantitatively analyze the polarization uniformity of the cross section of non-uniformly totally polarized beams and the types and proportions of each polarization state, and can provide effective guidance for the use of non-uniformly totally polarized beams.

BRIEF DESCRIPTION OF DRAWINGS

The drawings in the specification which form a part of the present disclosure are used to provide a further understanding of the present disclosure. The illustrative embodiments of the present disclosure and the descriptions thereof are used to explain the present disclosure, and do not constitute undue limitations on the present disclosure. In the attached drawings.

DESCRIPTION OF EMBODIMENTS

In order to make the above objects, features and advantages of the present disclosure more obvious and understandable, the following detailed description of the specific embodiments of the present disclosure will be made with reference to the drawings. In the following description, numerous specific details are set forth in order to provide a thorough understanding of the present disclosure. However, the present disclosure can be implemented in many other ways different from those described here, and those skilled in the art can make similar improvements without violating the connotation of the present disclosure, so the present disclosure is not limited by the specific implementation disclosed below.

Unless otherwise defined, all technical and scientific terms used herein have the same meanings as commonly understood by those skilled in the technical field of the present disclosure. The terminology used in this specification of the present disclosure is only for the purpose of describing specific embodiments, and is not intended to limit the present disclosure. The technical features of the above embodiments can be arbitrarily combined. To make the description concise, not all possible combinations of the technical features in the above embodiments are described. However, as long as there is no contradiction between the combinations of these technical features, they should be considered within the scope of the specification.

Embodiment 1

Figure 1:
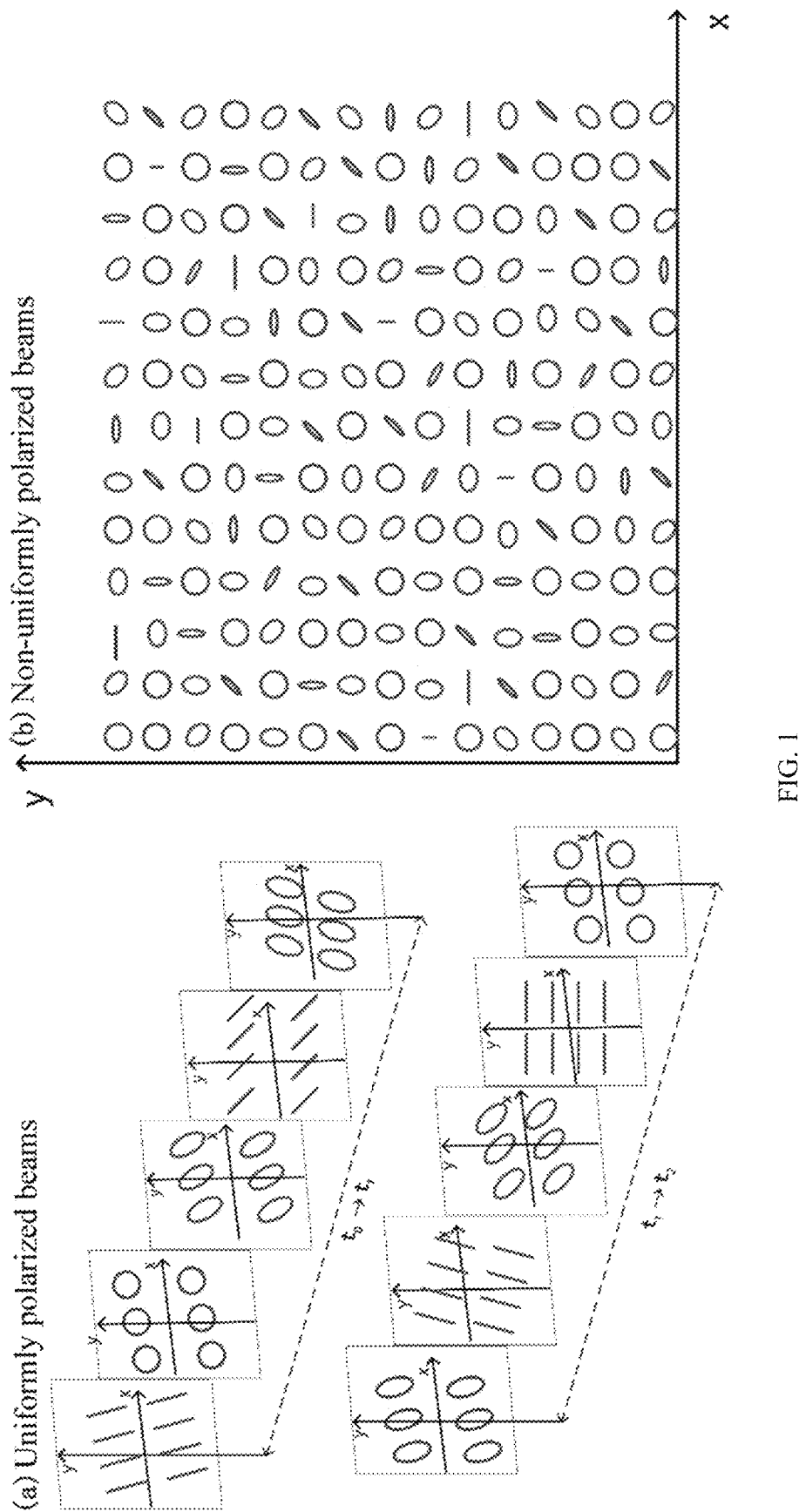
FIG. 1(a) is a schematic diagram of the evolution of polarization state distribution of uniformly polarized beams with time.
FIG. 1(b) is a schematic diagram of polarization state distribution of non-uniformly polarized beams.
Figure 4:
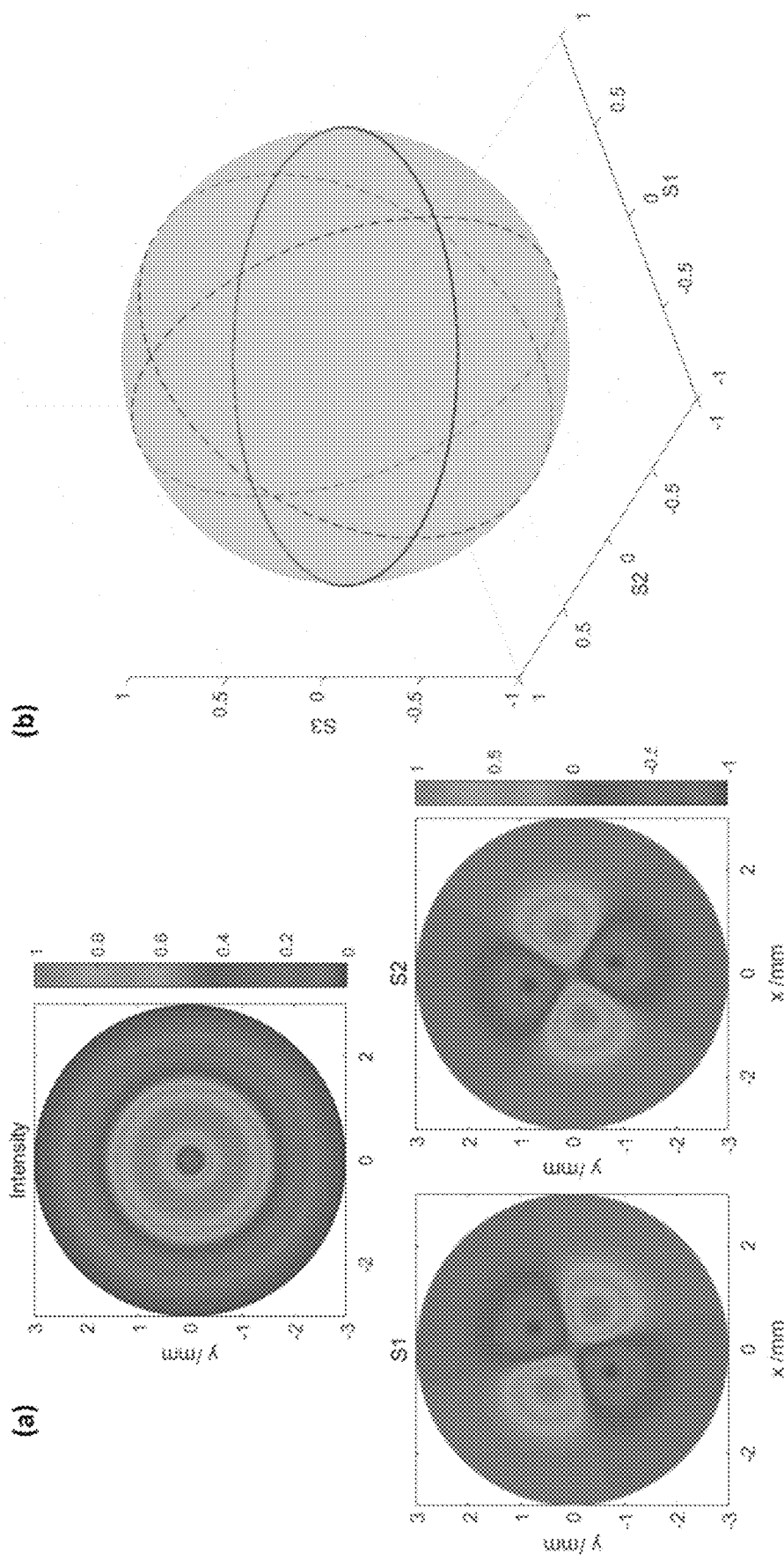
FIG. 4(a) is the light intensity and Stokes parameter distribution diagram of the spirally polarized beams.
FIG. 4(b) is the distribution diagram of polarization state of spirally polarized beams on the Poincare sphere.

Referring to FIG. 1, the comparison of polarization state distribution between uniformly polarized beams and non-uniformly polarized beams is given. It can be seen from FIG. 1(a) that for uniformly polarized beams, all points on the beam cross section show the same polarization state at any moment, and the polarization state only evolves with time; for non-uniformly polarized beams, as shown in FIG. 1(b), the polarization states are different at different positions of the beam cross section. Spirally polarized beams (SPBs) as a kind of common non-uniformly polarized beams, the polarization states on the cross section are linearly polarized beams, and the angle of linearly polarized beams changes with the radial angle of the beam cross section. The Jones matrix of the SPBs of this embodiment is as follows:

$$E_{SPBs}(r) = r \cdot \exp\left(-\frac{r^2}{w_0^2}\right) \cdot \begin{pmatrix} \cos(\theta + \gamma) \\ \sin(\theta + \gamma) \end{pmatrix} \tag{1}$$

where (r,θ) is the polar coordinate axis of the beam cross section, $\omega_0$ is the beam waist radius of the spot, and γ is a fixed angle, which determines the evolution angle of the linear polarization state of SPBs. When γ=0, the linear polarization distribution of the cross section of the SPBs grows along the radial direction, while when γ=π/2, the linear polarization distribution of the cross section of the SPBs grows along the tangential direction. FIG. 4(a) shows the light intensity and Stokes parameter distribution of SPBs in formula (1), in which the $S_3$ parameter of SPBs is zero. Using the Stokes parameter of the beam cross section in FIG. 4(a), the distribution of its polarization state on the Poincare sphere is obtained. As shown in FIG. 4(b), the polarization states on the cross section of the SPBs are all at the equator of the Poincare sphere, indicating that the polarization states are composed of linearly polarized beams at various angles.

Figure 2:
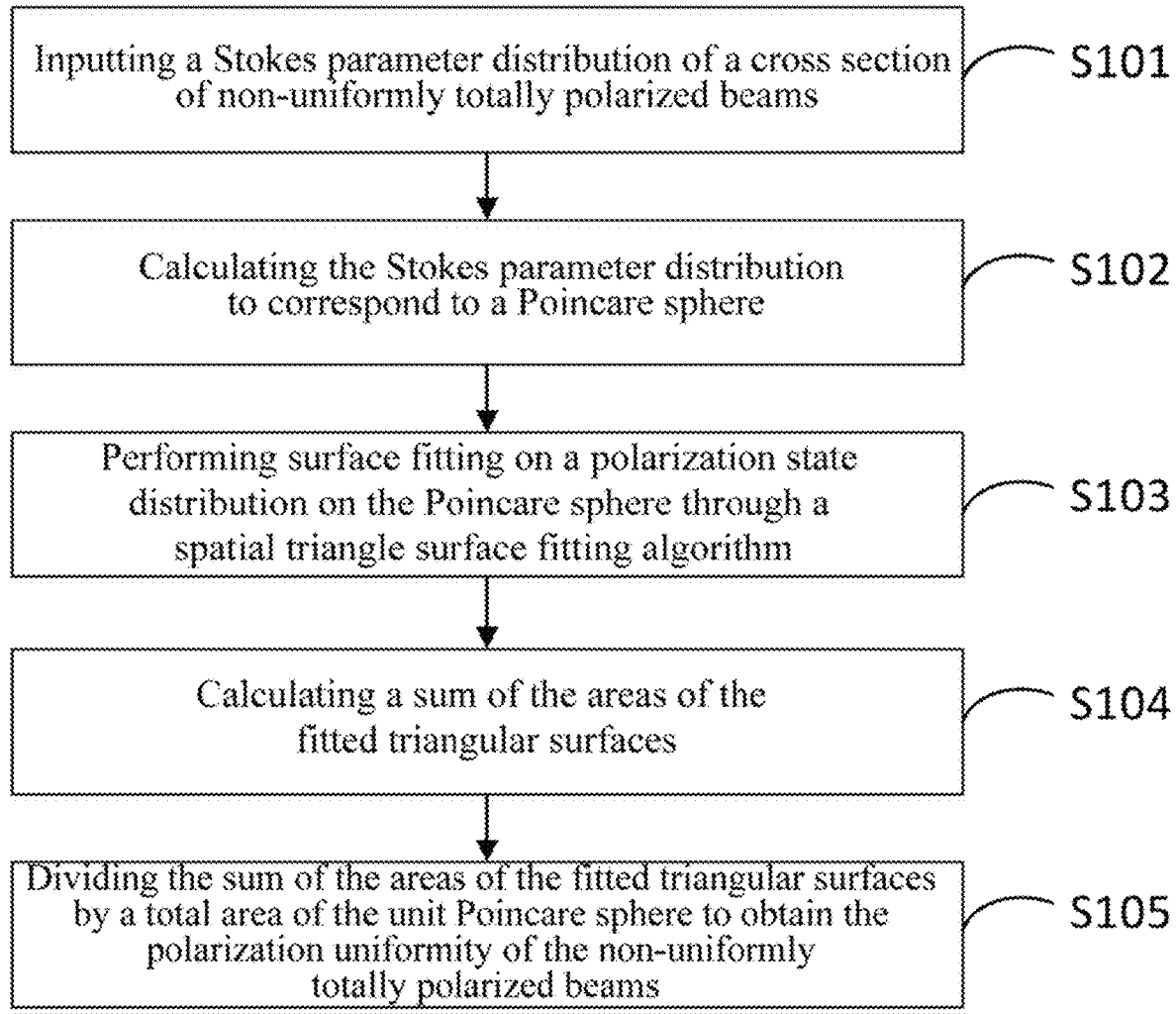
FIG. 2 is a flowchart of a method for measuring the polarization uniformity of non-uniformly totally polarized beams provided by the present embodiment.

The polarization uniformity of the SPBs is calculated. FIG. 2 gives a flow chart. An embodiment of the present disclosure provides a method for measuring the polarization uniformity of non-uniformly totally polarized beams, which includes the following steps:

S101, a Stokes parameter distribution of the cross section of non-uniformly totally polarized beams is input.

In an embodiment, in practical application, the Stokes parameter distribution can be measured by a CCD camera. As the polarization states on the cross section of SPBs are linearly polarized, they are all distributed on the equator of the Poincare sphere, so $S_3$ in the Stokes parameters is always zero, as shown in FIG. 4(a).

S102, the Stokes parameter distribution is calculated to correspond to the Poincare sphere.

In an embodiment, the normalized Stokes parameters can be calculated through the obtained Stokes parameter distribution, and the polarization state distribution of the beam cross section corresponds to the Poincare sphere, i.e. FIG. 4(b).

Figure 3:
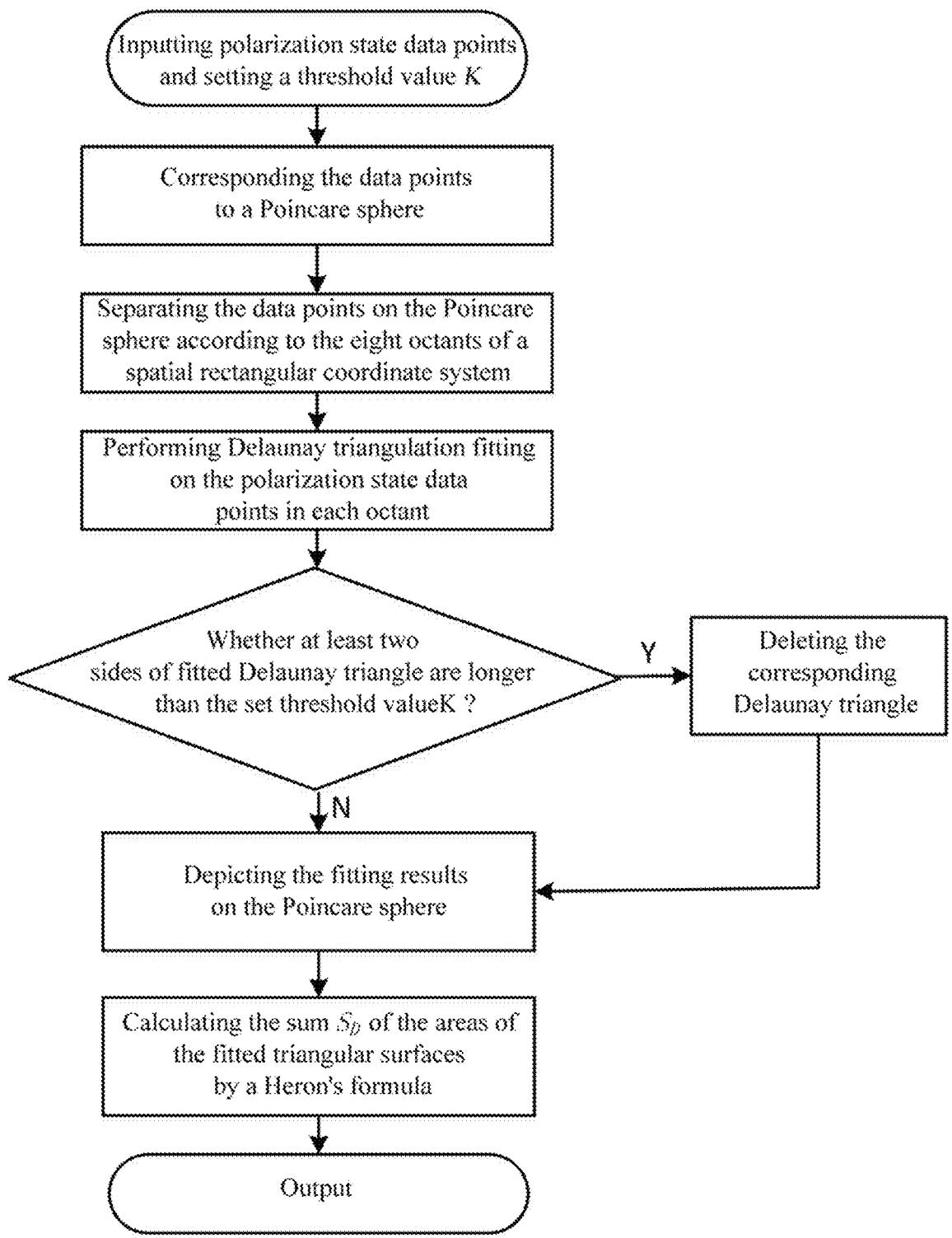
FIG. 3 is a flowchart of an improved Delaunay triangulation algorithm in the present embodiment.

S103, surface fitting is performed on the polarization state distribution on the Poincare sphere through a spatial triangle surface fitting algorithm (that is, an improved Delaunay triangulation algorithm), which, referring to FIG. 3, specifically includes:

S1031, inputting polarization data points and setting a threshold value K.

S1032, separating the polarization data points according to the eight octants of the spatial rectangular coordinate system; dividing the data points on the Poincare sphere into eight octants for Delaunay fitting respectively, which can reduce the computational cost of the algorithm, that is, the number of fitted Delaunay triangles.

S1033, performing Delaunay triangulation algorithm fitting on the polarization state data point in each octant.

S1034, judging whether at least two sides of fitted Delaunay triangle are longer than the set threshold value K, if so, deleting the corresponding Delaunay triangle; by deleting, screening and eliminating Delaunay triangles whose side length is greater than the threshold value K, the polarization state mutation data caused by errors in Stokes parameter distribution measurement can be avoided, and the fitting error can be reduced.

S1035, describing the remaining Delaunay triangles after the above deletion on the Poincare sphere.

S104, calculating the sum $S_D$ of the areas of the fitted triangular surfaces; specifically, the sum $S_D$ of the areas of the fitted triangular surfaces is calculated by a Heron's formula, which specifically includes:

Calculating the area $S_i$ of the corresponding Delaunay triangle according to the lengths of three sides of the fitted triangle:

$$S_i = \sqrt{p_i(p_i - a_i)(p_i - b_i)(p_i - c_i)} \tag{2}$$

where i is the serial number of the Delaunay triangle, and $p_i$, $a_i$, $b_i$ and $c_i$ are respectively the half circumference and lengths of the three sides of the Delaunay triangle, so the total area of surface fitting is $$S_D = \sum_i S_i.$$

S105, the $S_D$ is divided by the total area $S_0$ S of the unit Poincare sphere to obtain the polarization uniformity $\overline{U}$ of non-uniformly totally polarized beams.

Figure 5:
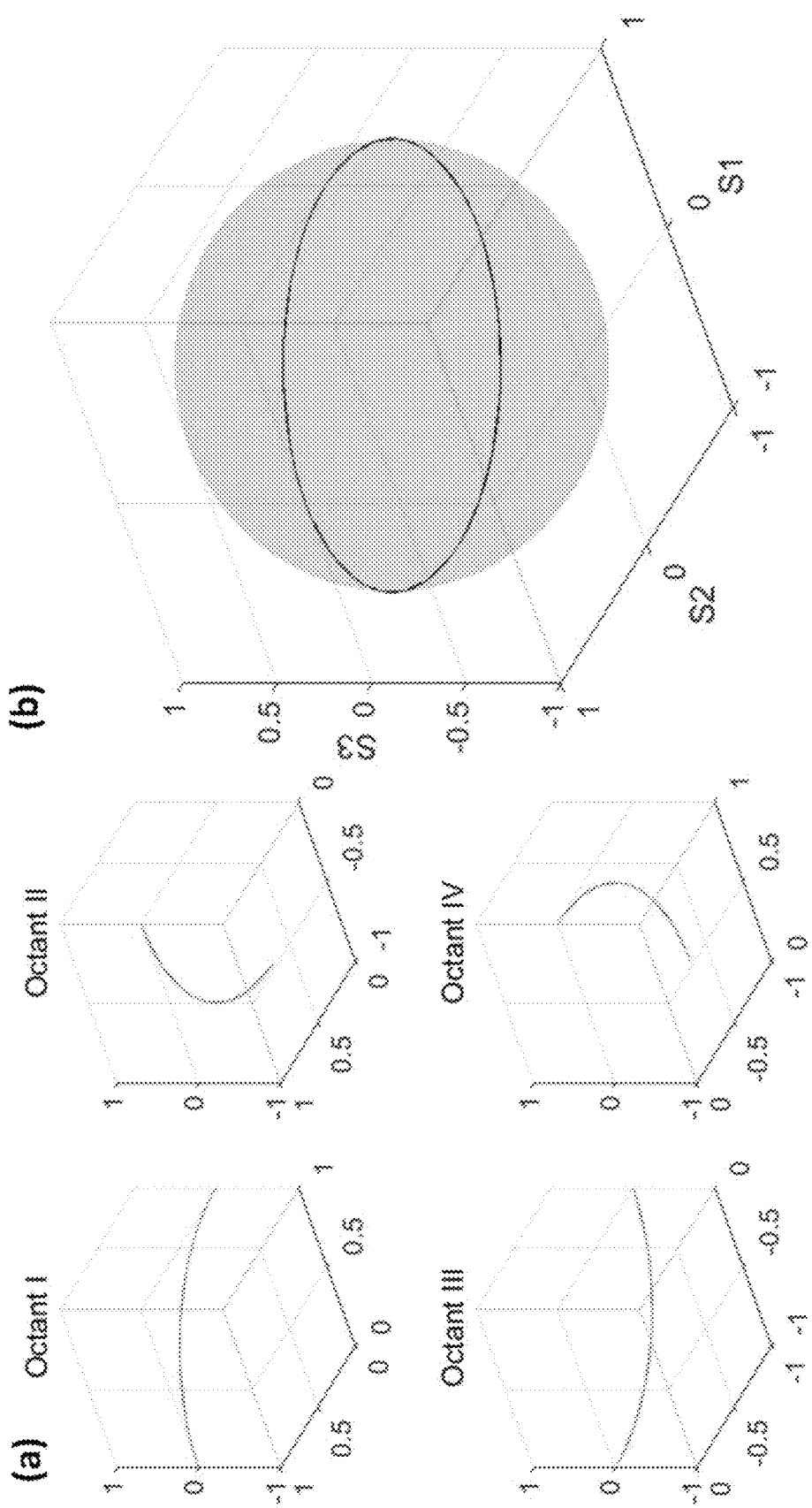
FIG. 5(a) is a graph of the fitting results within eight octants of the Poincare sphere using the polarization uniformity to measure the spirally polarized beams.
FIG. 5(b) is a graph of the total fitting result of the Poincare sphere using the polarization uniformity to measure the spirally polarized beams.

In an embodiment, FIG. 5(a) and FIG. 5(b) respectively show the polarization uniformity measurement of spirally polarized beams within the eight octants of the Poincare sphere and the total fitting result. It can be seen from FIG. 5(a) that the polarization states of SPBs are all distributed near the equator of the upper hemisphere of the Poincare sphere, that is, the first to fourth octants. The Delaunay triangle fitting area $S_D$=0.021, so the polarization uniformity of SPBs is:

$$\overline{U_S} = \frac{S_D}{S_0} = \frac{0.021}{4\pi} = 0.17\% \tag{3}$$

The polarization uniformity of SPBs is close to zero, which indicates that there are few types of polarization states on its cross section, only linearly polarized beams.

Further, the method also includes: performing mathematical statistics on the polarization state data points of non-uniformly totally polarized beams on the Poincare sphere to obtain the types and proportions of polarized beams existing on the beam cross section.

In an embodiment, the mathematical statistics of the polarization points on the Poincare sphere show that the proportion of linearly polarized beams is 100%, the proportion of right-handed elliptically polarized beams is 0, the proportion of left-handed elliptically polarized beams is 0, the proportion of right-handed circularly polarized beams is 0, and the proportion of left-handed circularly polarized beams is 0.

The embodiment of the present disclosure provides a use of a method for measuring the polarization uniformity of non-uniformly totally polarized beams for measuring the characteristics of non-uniformly totally polarized beams, and the method for measuring the polarization uniformity of non-uniformly totally polarized beams is the method described in the first aspect. The types and proportions of polarization states on the cross section can be obtained intuitively, which provides effective guidance for the use of SPBs.

Embodiment 2

Figure 6:
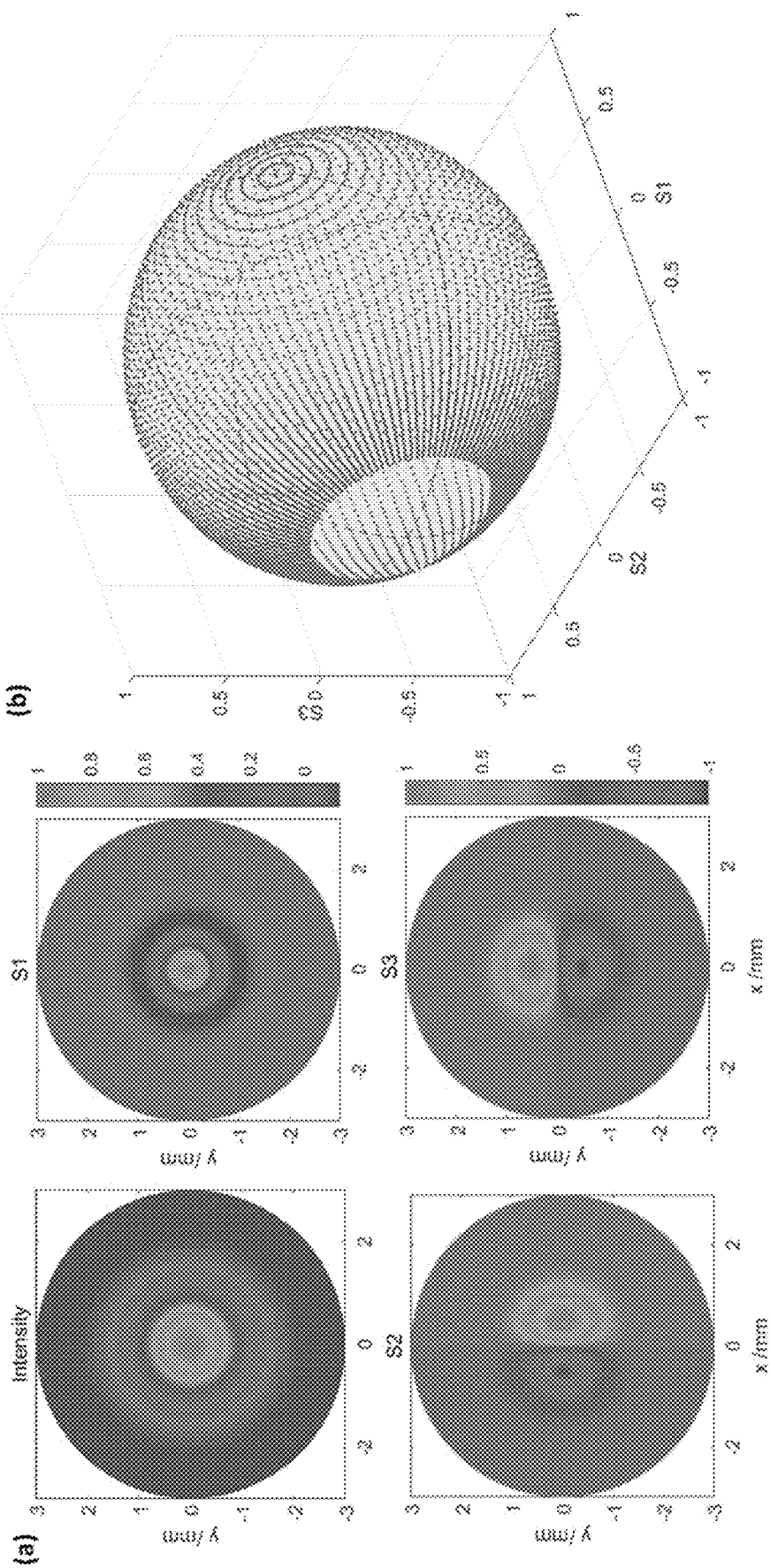
FIG. 6(a) is the light intensity and Stokes parameter distribution diagram of Laguerre-Gaussian beams when the beam waist of the spot is 1 mm.
FIG. 6(b) is the distribution diagram of the polarization state of Laguerre-Gaussian beams on the Poincare sphere when the beam waist of the spot is 1 mm.
Figure 8:
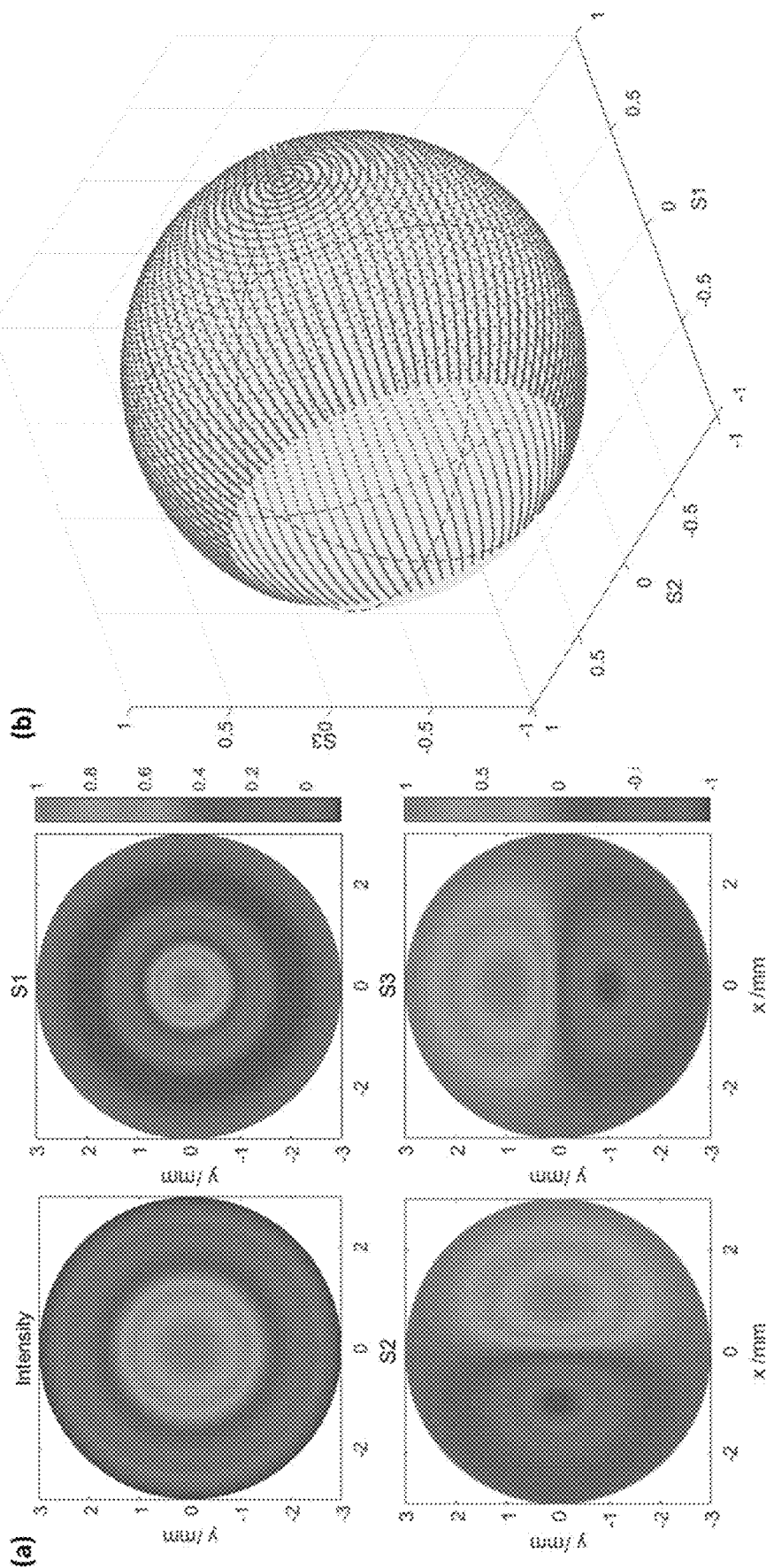
FIG. 8(a) is the light intensity and Stokes parameter distribution diagram of Laguerre-Gaussian beams when the beam waist of the spot is 2 mm.
FIG. 8(b) is the distribution diagram of the polarization state of Laguerre-Gaussian beams on the Poincare sphere when the beam waist of the spot is 2 mm.

In the present embodiment, the non-uniformly polarized beams LGBs superimposed by Laguerre and Gaussian mode fields is taken as an embodiment, and its Jones matrix is:

$$E_{LGBs}(r) = E_0 \cdot \exp\left(-\frac{r^2}{w_0^2}\right) \cdot \begin{pmatrix} \cos(\phi) \\ \frac{\sqrt{2}\,r}{\omega_0} e^{i\theta} \sin(\phi) \end{pmatrix} \quad (4)$$

where $E_0$ is a light field intensity and $\phi$ is a scale factor, which determines the proportions of the two modes in the beams. Refer to FIG. 6(a) for the light intensity and Stokes parameter distribution diagram of LGBs when the beam waist of the spot of LGBs is $\omega_0=1$ mm, and FIG. 6(b) for the polarization states distribution of the crosssection of LGBs on the Poincare sphere; refer to FIG. 8(a) for the light intensity and Stokes parameter distribution of LGBs when the beam waist of the spot of LGBs is $\omega_0=2$ mm, and FIG. 8(b) for the polarization states distribution of the cross section of LGBs on the Poincare sphere. By comparison, it can be seen that the polarization states of LGBs has no distribution near $S_1=-1$ on the Poincare sphere, and there is a circular arc gap. With the increase of the beam waist of the spot, the gap range of the polarization states on the Poincare sphere also increases, that is, the types of the polarization states on the cross section of LGBs decrease.

Figure 7:
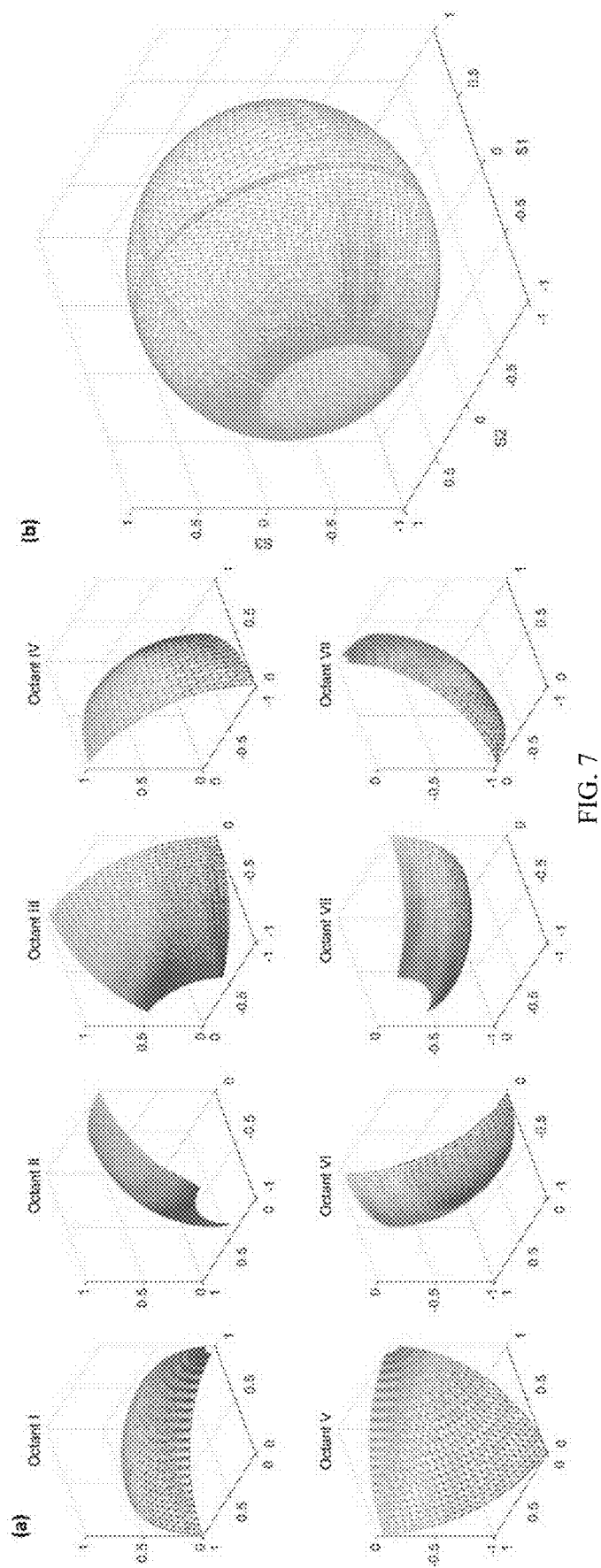
FIG. 7(a) is a graph of the fitting results within eight octants of the Poincare sphere of Laguerre-Gaussian beams when the beam waist of the spot is 1 mm measured by polarization uniformity.
FIG. 7(b) is a graph of the total fitting result of the Poincare sphere of Laguerre-Gaussian beams when the beam waist of the spot is 1 mm measured by the polarization uniformity.
Figure 9:
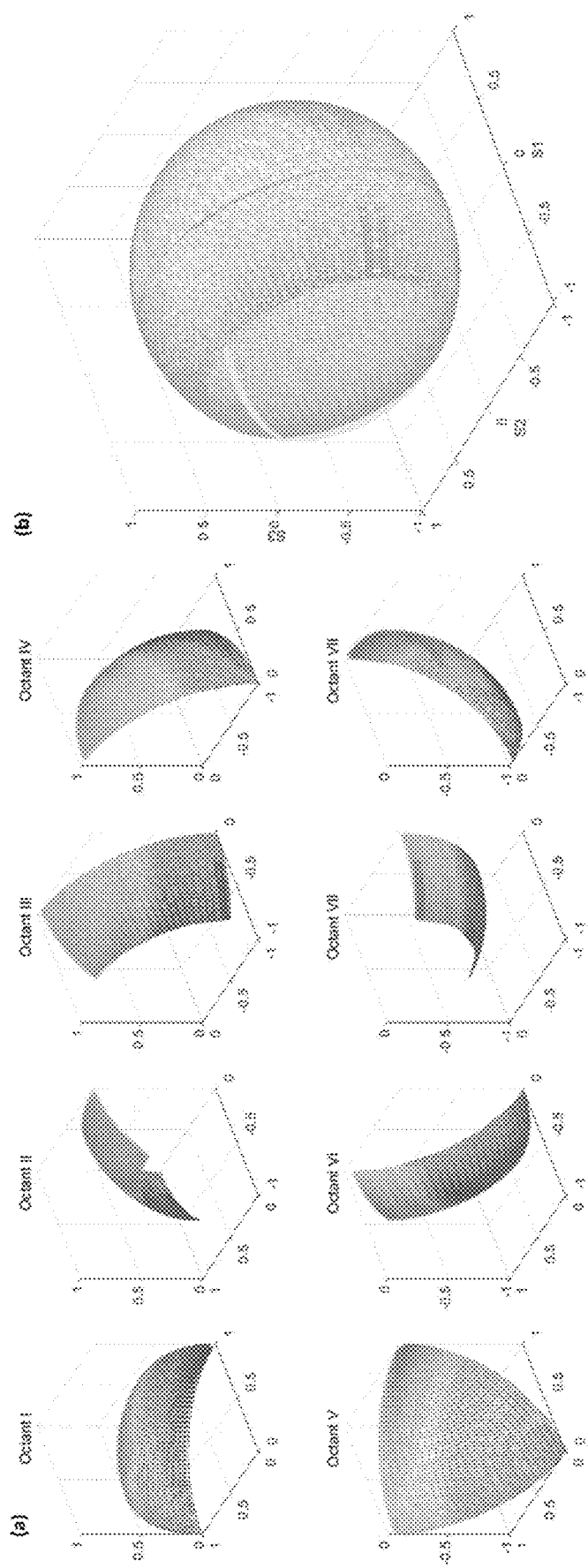
FIG. 9(a) is a graph of the fitting results within eight octants of the Poincare sphere of Laguerre-Gaussian beams when the beam waist of the spot is 2 mm measured by polarization uniformity.
FIG. 9(b) is a graph of the total fitting result of the Banga sphere of the Laguerre-Gaussian beams when the beam waist of the spot is 2 mm measured by the polarization uniformity.

This characteristic of LGBs can be quantitatively analyzed by using the polarization uniformity algorithm proposed in the present disclosure. FIGS. 7(a) and 9(a) show the fitting results within eight octants of the polarization uniformity algorithm under the radius of the above two beam waists of the spot, while FIGS. 7(b) and 9(b) show the fitting total output and the calculation results of polarization uniformity under two conditions:

$$\overline{U_{LG}}(\omega_0 = 1 \text{ mm}) = \frac{S_D}{S_0} = \frac{11.34}{4\pi} = 90.24\% \quad (5)$$

$$\overline{U_{LG}}(\omega_0 = 2 \text{ mm}) = \frac{S_D}{S_0} = \frac{9.92}{4\pi} = 78.96\% \quad (6)$$

The proportion of linearly polarized beams, right-handed elliptically polarized beams, left-handed elliptically polarized beams, right-handed circularly polarized beams and left-handed circularly polarized beams are 3.94%, 48.01%, 0.02% and 0.02%, respectively, when the beam waist of the spot of the LGBs is $\omega_0=1$ mm. The proportion of linearly polarized beams, right-handed elliptically polarized beams, left-handed elliptically polarized beams, right-handed circularly polarized beams and left-handed circularly polarized beams are 3.92%, 48.00%, 0.04% and 0.04%, respectively, when the beam waist of the spot of the LGBs is $\omega_0=2$ mm.

The fitting results show that with increasing the radius of the beam waist of LGBs, the corresponding polarization uniformity decreases, that is, the types of polarization states on the beam cross section decrease, but the content of each main polarization state does not change much. This embodiment provides a quantitative analysis method for measuring and distinguishing LGBs, non-uniformly polarized beams, with different radiuses of the beam waist, which can help better understand and apply Laguerre-Gaussian non-uniformly polarized beams.

Embodiment 3

The present embodiment takes the non-uniformly polarized beams, FPBs, whose polarization state covers the whole Poincare sphere as an embodiment. Different from the LGBs in Embodiment 2, FPBs are generated by superposition of Laguerre and Gaussian mode fields with orthogonal polarization states, and its Jones matrix is expressed as:

$$E_{FPBs}(r) = E_0 \cdot \exp\left(-\frac{r^2}{w_0^2}\right) \cdot \begin{pmatrix} \frac{r}{\omega_0} e^{i\theta} \cos(\phi) \\ \left(1 - \frac{2r^2}{\omega_0^2}\right) \sin(\phi) \end{pmatrix} \quad (7)$$

Figure 10:
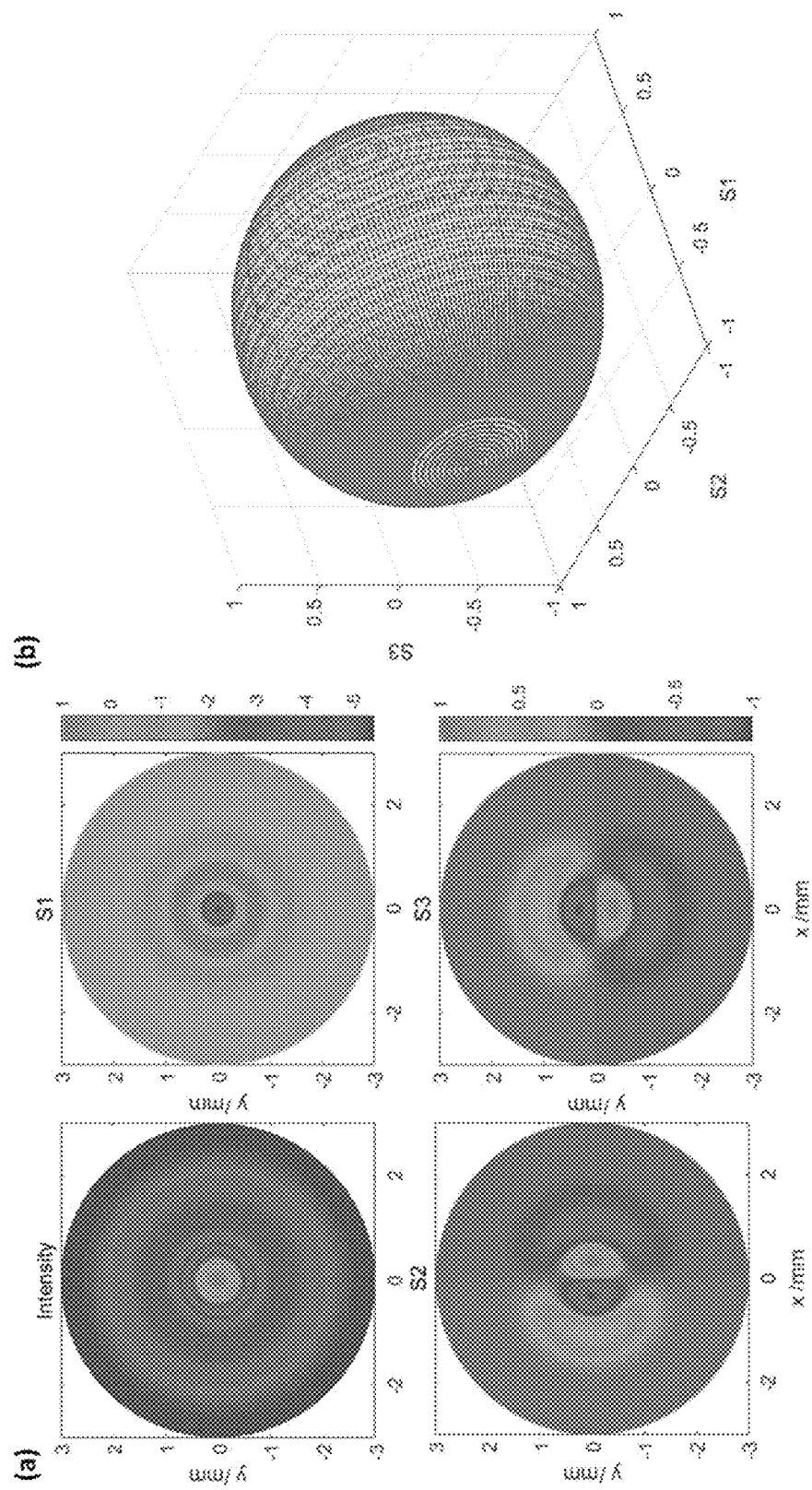
FIG. 10(a) is a graph showing the light intensity and Stokes parameter distribution of a biorthogonally polarized Laguerre-Gaussian beams.
FIG. 10(b) is a diagram showing the polarization state distribution of a biorthogonally polarized Laguerre-Gaussian beams on a Poincare sphere.

Referring to FIG. 10(a) for the light intensity and Stokes parameter distribution of FPBs, and FIG. 10(b) for the polarization state distribution of the cross section of FPBs on the Poincare sphere, it can be seen that polarization states of the cross section of FPBs are distributed on the whole Poincare sphere, that is, all polarization states are included.

Figure 11:
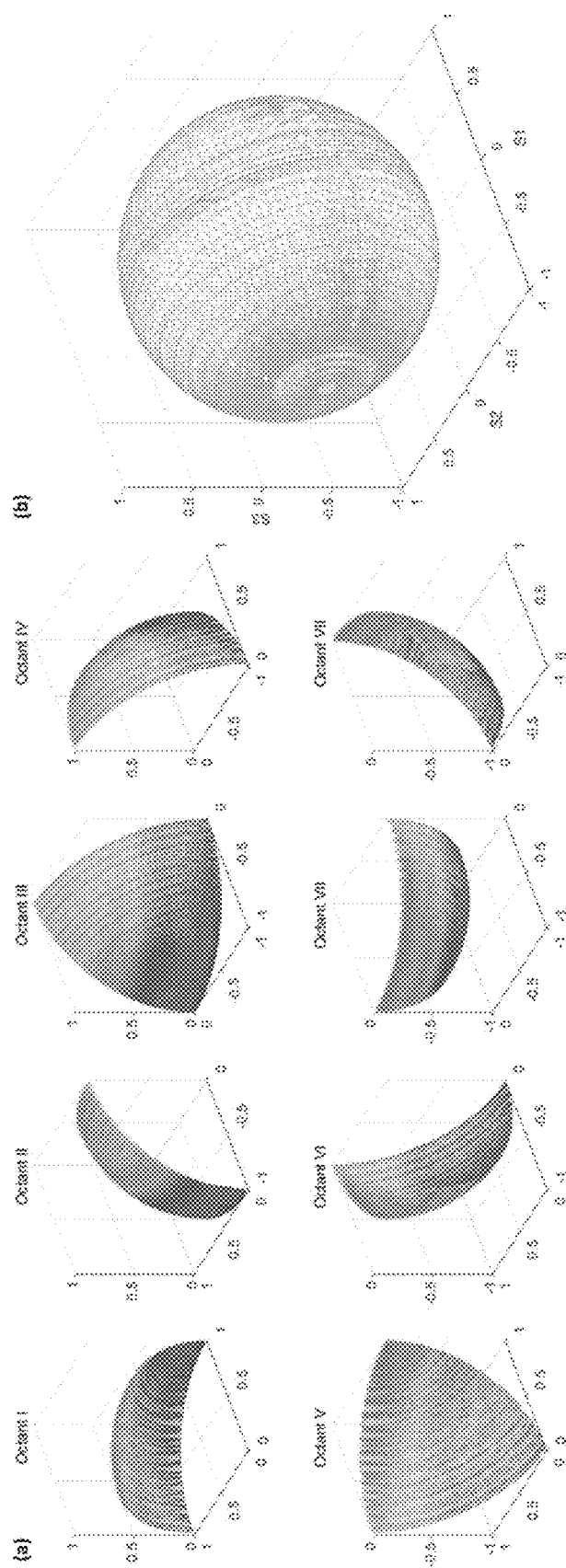
FIG. 11(a) is a graph of the fitting results within eight octants of the Poincare sphere for measuring the biorthogonally polarized Laguerre-Gaussian beams by using the polarization uniformity.
FIG. 11(b) is a graph of the total fitting result of the Poincare sphere for measuring the biorthogonally polarized Laguerre-Gaussian beams by using the polarization uniformity.

The FPBs can be quantitatively analyzed by using the polarization uniformity algorithm proposed in the present disclosure. FIGS. 11(a) and 11(b) respectively show the fitting total output and the fitting results within eight octants of the polarization uniformity algorithm, and at the same time give the calculation results of polarization uniformity:

$$\overline{U}_{FPBs} = \frac{S_D}{S_0} = \frac{12.51}{4\pi} = 99.55\% \quad (8)$$

The calculation results show that for FPBs, the cross section thereof contains all polarization states, and on the Poincare sphere, the polarization points cover the whole sphere, so the polarization uniformity thereof is 100%, and the fitting output result is 99.55%. Therefore, the present embodiment can prove that the polarization uniformity and its algorithm proposed by the present disclosure are reasonable and correct.

Embodiment 4

Figure 12:
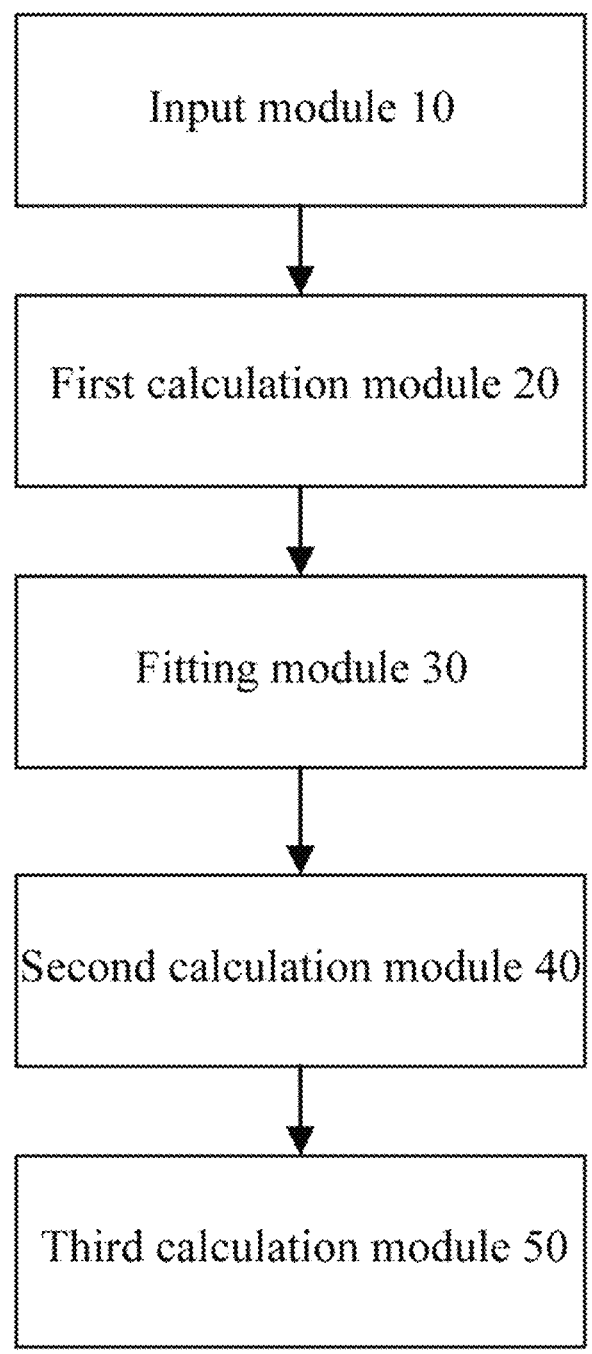
FIG. 12 is a block diagram of a device for measuring polarization uniformity of non-uniformly totally polarized beams provided by the present embodiment.

The present embodiment provides a device for measuring the polarization uniformity of non-uniformly totally polarized beams. Referring to FIG. 12, the device according to the present embodiment corresponds to Embodiment 1, and includes at least one processors and a memory configured to store programmable instructions executable by at least one processors, and the instructions are programmed as the following modules:

An input module 10 configured for inputting a Stokes parameter distribution of a cross section of non-uniformly totally polarized beams.

A first calculation module 20 configured for calculating the stoke parameter distribution to correspond to a Poincare sphere.

A fitting module 30 configured for performing surface fitting on a polarization state distribution on the Poincare sphere through a spatial triangle surface fitting algorithm.

A second calculation module 40 configured for calculating a sum $S_D$ of the areas of the fitted triangular surfaces.

A third calculation module 50 configured for dividing $S_D$ by a total area $S_0$ of the unit Poincare sphere to obtain the polarization uniformity $\overline{U}$ of non-uniformly totally polarized beams.

Further, the device also includes:

A statistic module configured for performing mathematically statistics on the polarization state data points of non-uniformly totally polarized beams on the Poincare sphere to obtain the types and proportions of polarized beams existing on the beam cross section.

Embodiment 5

The present embodiment provides an electronic equipment, including:
One or more processors;
A memory for storing one or more programs;
When the one or more programs are executed by the one or more processors, the one or more processors implement the method as described in Embodiment 1.

Embodiment 6

The present embodiment provides a computer readable storage medium on which a computer program is stored, when the program executed by a processor, implements the method according to Embodiment 1.

The above serial numbers of the embodiments of the present disclosure are for description only, and do not represent the advantages and disadvantages of the embodiments.

In the above embodiments of the present disclosure, the description of each embodiment has its own emphasis. For the parts not detailed in one embodiment, please refer to the related descriptions of other embodiments.

In the several embodiments provided in this application, it should be understood that the disclosed technical content can be realized by other ways. Among them, the above device embodiment is only schematic, for example, the division of the units may be a logical function division, and there may be other division modes in actual implementation, for example, multiple units or combinations may be combined or integrated into another system, or some features may be ignored or not executed. On the other hand, the shown or discussed mutual coupling or direct coupling or communication connection may be indirect coupling or communication connection through some interfaces, units or modules, which may be in electrical or other forms.

The units described as separate components may or may not be physically separated, and the components displayed as units may or may not be physical units, that is, they may be located in one place or distributed over multiple units. Some or all of the units can be selected according to the actual needs to achieve the purpose of the present embodiment.

In addition, each functional unit in each embodiment of the present disclosure may be integrated in one processing unit, each unit may exist physically alone, or two or more units may be integrated in one unit. The above-mentioned integrated units may be realized in the form of hardware or software functional units.

If the integrated unit is implemented in the form of a software functional unit and sold or used as an independent product, it can be stored in a computer readable storage medium. Based on this understanding, the technical solution of the present disclosure, which essentially contributes to the prior art, or all or part of the technical solution can be embodied in the form of a software product, which is stored in a storage medium and includes a number of instructions to make a computer device (such as a personal computer, a server or a network device, etc.) perform all or part of the steps of the methods described in various embodiments of the present disclosure. The aforementioned storage media include: U disk, Read-Only Memory (ROM), Random Access Memory (RAM), removable hard disk, magnetic disk or optical disk and other media that can store program codes.

The above are only the preferred embodiments of the present disclosure, and it should be pointed out that for those of ordinary skill in the technical field, without departing from the principle of the present disclosure, several improvements and embellishments can be made, and these improvements and embellishments should also be regarded as the protection scope of the present disclosure.

What is claimed is:

1. A method for measuring a polarization uniformity of non-uniformly totally polarized beams, wherein the method is implemented by a charge coupled device (CCD) camera, a computer, and one or more of an optical tweezer microscope, a surface plasmon detector, and a polarization tester, and the method comprises following steps:

measuring, by the CCD camera, a Stokes parameter distribution of a cross section of non-uniformly totally polarized beams, wherein the non-uniformly totally polarized beams are spirally polarized beams, polarization states on the cross section of non-uniformly totally polarized beams are linearly polarized beams, an angle of linear polarized beams changes with a radial angle of the cross section, and a Jones matrix of the spirally polarized beams satisfies:

$$E_{SPBs}(r) = r \cdot \exp\left(-\frac{r^2}{w_0^2}\right) \cdot \begin{pmatrix} \cos(\theta + \gamma) \\ \sin(\theta + \gamma) \end{pmatrix}$$

where $(r,\theta)$ is a polar coordinate axis of the cross section, $\omega_0$ is a beam waist radius of a spot, and $\gamma$ is a fixed angle, which determines an evolution angle of a linear polarization state of the spirally polarized beams, when $\gamma=0$, a linear polarization distribution of the cross section of the spirally polarized beams grows along a radial direction, while when $\gamma=\pi/2$, the linear polarization distribution of the cross section of the spirally polarized beams grows along a tangential direction;

inputting the Stokes parameter distribution of the cross section of non-uniformly totally polarized beams into the computer, and performing, by the computer, following steps;

calculating normalized Stokes parameters through the Stokes parameter distribution, and corresponding a polarization state distribution of the cross section to a Poincare sphere;

performing surface fitting on a polarization state distribution on the Poincare sphere through a spatial triangle surface fitting algorithm;

calculating a sum $S_D$ of the areas of the fitted triangular surfaces; and dividing $S_D$ by a total area $S_0$ of the unit Poincare sphere to obtain the polarization uniformity $U$ of the non-uniformly totally polarized beams;

transferring the polarization uniformity $U$ to one or more of the optical tweezer microscope, the surface plasmon detector, and the polarization tester;

wherein the sum $S_D$ of the areas of the fitted triangular surfaces is calculated by a Heron's formula, which comprises:

$$S_i = \sqrt{p_i(p_i - a_i)(p_i - b_i)(p_i - c_i)}$$

where i is a serial number of the fitted Delaunay triangle, and $p_i$, $a_i$, $b_i$ and $c_i$ are respectively the half circumference and lengths of the three sides of the Delaunay triangle, and the total area of surface fitting is $$S_D = \sum S_i.$$

2. The method for measuring a polarization uniformity of non-uniformly totally polarized beams according to claim 1, wherein said performing surface fitting on the polarization state distribution on the Poincare sphere through the spatial triangle surface fitting algorithm comprises following steps:
   inputting polarization state data points and setting a threshold value K;
   separating the polarization state data points according to the eight octants of a spatial rectangular coordinate system;
   performing Delaunay triangulation algorithm fitting on the polarization state data points in each octant;
   judging whether at least two sides of fitted Delaunay triangles are longer than the set threshold value K, if yes, deleting the corresponding Delaunay triangle; and
   describing the remaining Delaunay triangles after the above deletion on the Poincare sphere.

3. The method for measuring a polarization uniformity of non-uniformly totally polarized beams according to claim 1, further comprising:
   performing mathematically statistics on the polarization state data points of non-uniformly totally polarized beams on the Poincare sphere to obtain the types and proportions of polarized beams existing on the beam cross section.

4. Electronic equipment, comprising:
   one or more processors;
   a memory for storing one or more programs;
   wherein when the one or more programs are executed by the one or more processors, the one or more processors implement the method according to claim 1.

5. A computer readable storage medium on which a computer program is stored, wherein the program, when executed by a processor, implements the method according to claim 1.

6. A device for measuring a polarization uniformity of non-uniformly totally polarized beams, comprising:
   a charge coupled device (CCD) camera configured to measure a Stokes parameter distribution of a cross section of non-uniformly totally polarized beams, wherein the non-uniformly totally polarized beams are spirally polarized beams, polarization states on the cross section of non-uniformly totally polarized beams are linearly polarized beams, an angle of linear polarized beams changes with a radial angle of the cross section, and a Jones matrix of the spirally polarized beams satisfies:

$$E_{SPBs}(r) = r \cdot \exp\left(-\frac{r^2}{w_0^2}\right) \cdot \begin{pmatrix} \cos(\theta + \gamma) \\ \sin(\theta + \gamma) \end{pmatrix}$$

where $(r,\theta)$ is a polar coordinate axis of the cross section, $\omega_0$ is a beam waist radius of a spot, and $\gamma$ is a fixed angle, which determines an evolution angle of a linear polarization state of the spirally polarized beams, when $\gamma=0$, a linear polarization distribution of the cross section of the spirally polarized beams grows along a radial direction, while when $\gamma=\pi/2$, the linear polarization distribution of the cross section of the spirally polarized beams grows along a tangential direction;
one or more of an optical tweezer microscope, a surface plasmon detector, and a polarization tester;
at least one processor, and
a memory configured to store programmable instructions executable by at least one processors, wherein the instructions cause the at least one processor to:
input the Stokes parameter distribution of the cross section of non-uniformly totally polarized beams;
calculate normalized Stokes parameters through the stokes parameter distribution, and correspond a polarization state distribution of the cross section to a Poincare sphere;
perform surface fitting on a polarization state distribution on the Poincare sphere through a spatial triangle surface fitting algorithm;
calculate a sum $S_D$ of the areas of the fitted triangular surfaces; and
divide $S_D$ by a total area $S_0$ of the unit Poincare sphere to obtain the polarization uniformity U of non-uniformly totally polarized beams;
transfer the polarization uniformity U to one or more of the optical tweezer microscope, the surface plasmon detector, and the polarization tester;
wherein the sum $S_D$ of the areas of the fitted triangular surfaces is calculated by a Heron's formula, which comprises:

$$S_i = \sqrt{p_i(p_i - a_i)(p_i - b_i)(p_i - c_i)}$$

where i is a serial number of the fitted Delaunay triangle, $p_i$, $a_i$, $b_i$ and $c_i$ are respectively the half circumference and lengths of the three sides of the Delaunay triangle, and the total area of surface fitting is $$S_D = \sum S_i.$$

7. The device according to claim 6, further comprising:
   a statistic module configured for performing mathematically statistics on the polarization state data points of non-uniformly totally polarized beams on the Poincare sphere to obtain the types and proportions of polarized beams existing on the beam cross section.

* * * * *